No. 792,981. Patented June 20, 1905.

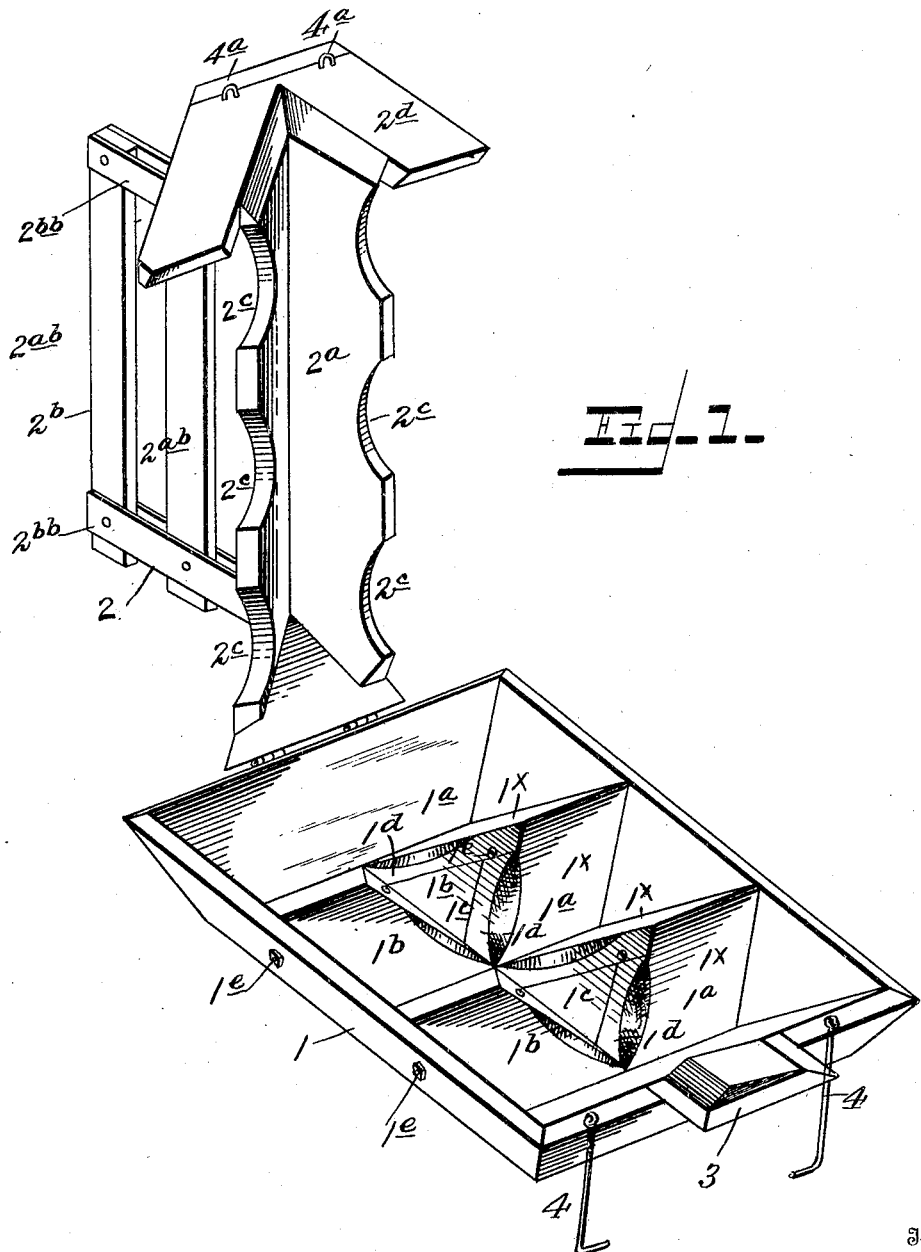

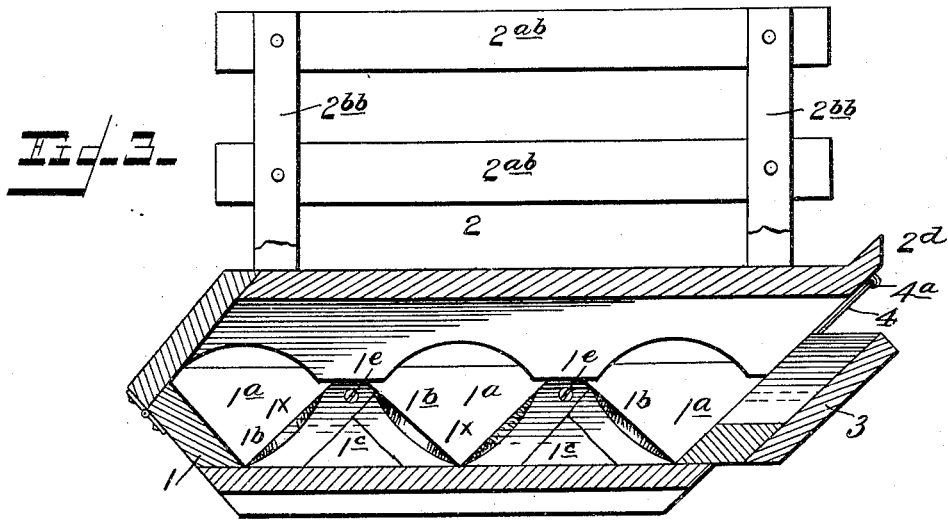
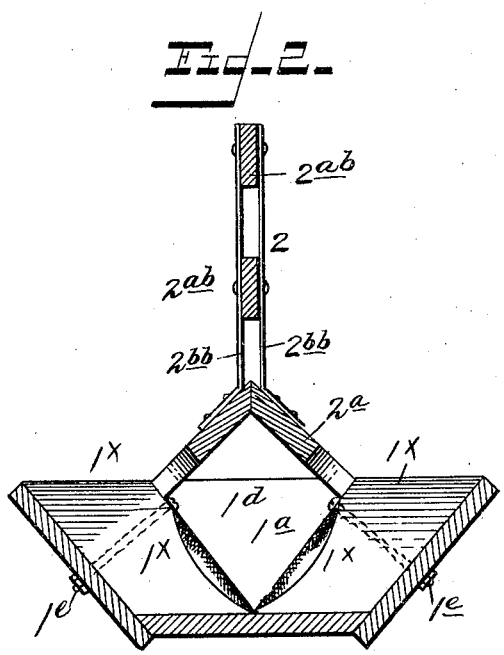
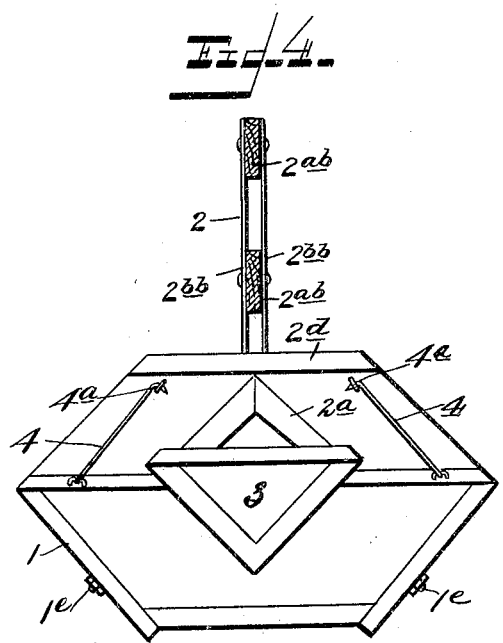

UNITED STATES PATENT OFFICE.

OLIVER H. P. GOOD AND JOSEPH W. GOOD, OF AUBURN, NEBRASKA.

HOG-TROUGH.

SPECIFICATION forming part of Letters Patent No. 792,981, dated June 20, 1905.

Application filed September 12, 1904. Serial No. 224,201.

*To all whom it may concern:*

Be it known that we, OLIVER H. P. GOOD and JOSEPH W. GOOD, citizens of the United States, residing at Auburn, in the county of Nemaha and State of Nebraska, have invented new and useful Improvements in Hog-Troughs, of which the following is a specification.

Our invention relates to improvements in what may be termed "hog" or "animal" troughs.

It has generally for its object to provide for the individual feeding of the animals, and yet form a common receptacle or trough, and so that they may not encroach one upon the other, and to prevent their wasting or "nosing" the food or the contents of their respective feeding-compartments out of the latter.

It also precludes the hog or animal placing his forward feet into the compartment or trough as in eating.

Further, it provides for the simultaneous feeding of two different "sets" or sizes of hogs and for facilitating the feeding of the food or garbage to the animals, as well as for removing sediment, &c., from the trough.

Said invention consists of certain structural features, substantially as hereinafter more fully disclosed, and particularly pointed out by the claims.

In the accompanying drawings, illustrating the preferred embodiment of our invention, Figure 1 is a perspective view thereof, with the compartment subdividing partition or guard elevated. Fig. 2 is a cross-section. Fig. 3 is a longitudinal section, and Fig. 4 is a view of the food-supplying end of the trough.

In the carrying out of our invention we provide a receptacle or trough proper, 1, of any required capacity, with preferably inward and downward inclined end and lateral portions, the purpose of which is obvious. Said trough proper or receptacle is divided into a number of feeding compartments or chambers $1^a$ by means of a plurality of transverse partitions $1^b$, arranged and suitably secured within said receptacle or trough. Said partitions are each principally comprised of two inclined members or boards $1^x$, secured upon a central tapered horizontal member or timber $1^c$, said boards having upper meeting or converging edges, while the lower diverging edges of the intermediary boards join each other, and the corresponding edges of the end boards join the bottom edges of the inward-inclined end portions or walls of the receptacle or trough. Said chambers or compartments are thus formed with downward-converging walls terminating in tapered bottoms as preferable for the purposes of food-holding or feeding chambers, as is apparent. Said partitions are themselves subdivided or cut in two transversely and about centrally by removing, as it were, therefrom V-shaped portions, producing correspondingly-shaped passage-ways $1^d$ therethrough, with the otherwise thus-formed angular edges upon said partitions preferably concaved or removed for obvious reasons. Said passage-ways provide for the unobstructed flow of the garbage or other food from one compartment or chamber to the other as said garbage or food is delivered or poured into the trough at one end, as presently made apparent. Thus the contents of the several compartments or chambers of the trough mutually contribute to the replenishing of the other accordingly as the contents of one or the other is consumed by an animal. Also it is noted that the residue of any one chamber or compartment, or any nosing of the contents thereof by the animal or hog, will be received by the adjoining compartment or chamber, thus preventing the wasting of said contents or food in that way, as has heretofore been experienced.

The securing means between the horizontal tapered member $1^c$ and the two parts of a board $1^x$ of each partition $1^b$ consists, preferably, of two screw-rods $1^e$, passed through said member and said parts, respectively, with their upper ends provided with heads and their opposite ends having applied thereto nuts.

Arranged to rest upon the trough 1 at its longitudinal center and hinged thereto at one end is a guard or partition 2, consisting, preferably, of an inverted-V-shaped base member $2^a$ and a "panel" $2^b$, formed of uprights $2^{bb}$, secured at their lower ends to said base member at its ends, and longitudinal boards 2$^{ab}$, secured between said uprights. Said base member has its flared or divergent portions provided with preferably concaved notches or recesses 2$^c$, arranged just above and coincidentally with the compartments or chambers 1$^a$ of the trough and to provide for limiting the extent to which the animals or hogs may insert their snouts into the compartment or chamber to properly reach the food or contents thereof and yet preclude the animals getting their feet at the same time into said compartment. As the compartments or chambers by reason of the construction above described recede downward and centrally toward the bottom, the tendency is to cause the animal or hog to reach forward for its food or contents therein, and thus almost wholly obviate the liability of its wasting the food over the forward edge of the trough. It will also be noted that by the use of the panel hogs or animals can be divided up as to sizes, thus permitting the feeding of different sizes at the same time upon opposite sides of said panel. At the opposite or forward end of the trough 1 is provided a chute or hopper 3 for delivering or pouring the food or garbage thereinto, said chute or hopper being partially formed by an inward and downward inclined board or extension 2$^d$ of the base member 2$^a$ at that end thereof, it having an inverted-V-shaped opening therethrough opposite said hopper or chute for the passage of the food or garbage from the latter into the trough. Thus the forward end of the guard or partition is adapted to be suitably held in place by means, preferably, of hooks 4, loosely connected to the trough edge and adapted to be engaged with staples or eyes 4$^a$, secured to the under side of the board extension 2$^d$ of said guard or partition. Also it is noted that by being enabled to deliver or pour the food for the animals or hogs into the trough from one end thereof, as herein shown, this can be done with much greater facility and less trouble than where it is required to come directly in contact with the hogs for that purpose.

Latitude, it will be understood, is allowed herein as to details, as they may be changed as circumstances suggest without departing from the spirit of our invention for that purpose, the trough or device to be made out of wood, iron, or cement, or a combination of the same.

We claim—

1. A device of the character described, comprising a compartment-receptacle, compartment-forming partitions therefor provided with laterally-diverging walls having upper converging edges, said partitions having transverse central passage-ways therethrough.

2. A device of the character described, comprising a compartment-receptacle and a guard therefor effective to limit the extent to which the animals may insert their snouts thereinto and having recesses or notches each spanning a compartment or chamber of said receptacle.

3. A device of the character described, comprising a compartment-receptacle, compartment-forming partitions therefor having a transverse passage-way therethrough, and a guard therefor effective to limit the extent to which the animals may insert their snouts into said receptacle, and having recesses or notches coinciding with, and arranged just above the receptacle-compartments of said receptacle.

4. A device of the character described, comprising a compartment-receptacle compartment-forming partitions therefor provided with central transverse passage-ways therethrough, a guard hinged to one end of said receptacle and having its base member provided with notches or recesses coinciding with the chambers or compartments of said receptacle, said guard having a panel member extending across the same at about its longitudinal center.

5. A device of the character described, comprising a receptacle having feeding compartments or chambers and a supply chute or hopper at one end, and a guard hinged or pivoted to the opposite end of said receptacle, and having an inclined board extension, adapted to partially form said chute or hopper.

In testimony whereof we have signed our names to this specification in the presence of two subscribing witnesses.

OLIVER H. P. GOOD
JOSEPH W. GOOD.

Witnesses:
H. A. LAMBERT,
FRED G. HAWNBY.